(12) United States Patent
Valk

(10) Patent No.: US 8,185,662 B2
(45) Date of Patent: May 22, 2012

(54) USING END-TO-END CREDIT FLOW CONTROL TO REDUCE NUMBER OF VIRTUAL LANES IMPLEMENTED AT LINK AND SWITCH LAYERS

(75) Inventor: Kenneth Michael Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 12/719,214

(22) Filed: Mar. 8, 2010

(65) Prior Publication Data

US 2011/0219139 A1 Sep. 8, 2011

(51) Int. Cl.
*G06F 15/16* (2006.01)
(52) U.S. Cl. ......... 709/249; 709/217; 709/227; 709/232
(58) Field of Classification Search .................. 709/217, 709/227, 232, 249
See application file for complete search history.

(56) References Cited

U.S. PATENT DOCUMENTS

| 6,850,495 | B1* | 2/2005 | Baum et al. ................ 709/249 |
| 2002/0049841 | A1* | 4/2002 | Johnson et al. ............ 709/225 |
| 2005/0060414 | A1* | 3/2005 | Phillips et al. ............. 709/227 |

* cited by examiner

*Primary Examiner* — Phuoc Nguyen
(74) *Attorney, Agent, or Firm* — Joan Pennington

(57) ABSTRACT

A method and circuit for implementing enhanced transport layer flow control, and a design structure on which the subject circuit resides are provided. The transport layer provides multiple virtual lanes to application layers, and provides buffering and credit control for the multiple virtual lanes. A source transport layer sends a credit request message to a destination transport layer for an outstanding packets transmission. The packets are sent only responsive to the credit request being granted by the destination transport layer. Respective switch and link layer are constructed to support only a single virtual lane, regardless of how many virtual lanes are supported at the application and transport layers. As a result, the routing, buffering, and flow control at the respective switch and link layer are simplified.

23 Claims, 10 Drawing Sheets

USING END-TO-END CREDIT FLOW CONTROL TO REDUCE NUMBER OF VIRTUAL LANES IMPLEMENTED AT LINK AND SWITCH LAYERS

FIELD OF THE INVENTION

The present invention relates generally to the data processing field, and more particularly, relates to a method and circuit for implementing end-to-end credit flow control to reduce a number of virtual lanes that are implemented at switch and link layers, and a design structure on which the subject circuit resides.

DESCRIPTION OF THE RELATED ART

High speed serial (HSS) links are used for communications in various known computer chips and computer systems. Networks typically provide multiple Virtual Lanes (VLs) to a source/destination pair to allow different types of traffic to flow, where blocking one type of traffic does not also prevent other types of traffic from flowing, such as Request/Response, Remote Direct Memory Access (RDMA)/Transmission Control Protocol (TCP) and Internet Protocol (IP) TCPIP/Fibre Channel over Ethernet (FCoE), and the like.

Typically the virtual lanes are implemented from the application layer down through multiple layers including the transport layer, switch, and link layers increasing chip cost due to the buffering, arbitration, and control logic needed for the virtual lanes.

A need exists for an effective method and circuit to implement enhanced transport layer flow control. It is desirable to provide such method and circuit that reduces a number of virtual lanes that are implemented at the switch and link layers.

SUMMARY OF THE INVENTION

Principal aspects of the present invention are to provide a method and circuits for implementing enhanced transport layer flow control, and a design structure on which the subject circuit resides. Other important aspects of the present invention are to provide such method, circuitry, and design structure substantially without negative effect and that overcome many of the disadvantages of prior art arrangements.

In brief, a method and circuit for implementing enhanced transport layer flow control, and a design structure on which the subject circuit resides are provided. A transport layer is coupled to an application layer. A respective switch and link layer is coupled between a source transport layer and a destination transport layer. The transport layer provides multiple virtual lanes to application layers, and provides buffering and credit control for the multiple virtual lanes. A source transport layer sends a credit request message to a destination transport layer for an outstanding packets transmission. The packets are sent only responsive to the credit request being granted by the destination transport layer.

In accordance with features of the invention, the source transport layer includes a transmit credit control and the destination transport layer includes a receive credit control. The transmit credit control sends a credit decrease request message to a destination transport layer to release granted credits responsive to an acknowledge message for sent packets received from granted by the destination transport layer. The granted credits are released responsive to the credit decrease request being granted by the destination transport layer.

In accordance with features of the invention, the respective switch and link layer are constructed to support only a single virtual lane, independent of the number of multiple virtual lanes supported at the application and transport layers. As a result, the routing, buffering, and flow control at the respective switch and link layer are simplified.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, circuits and methods are provided for implementing enhanced transport layer flow control.

Figure 1A:
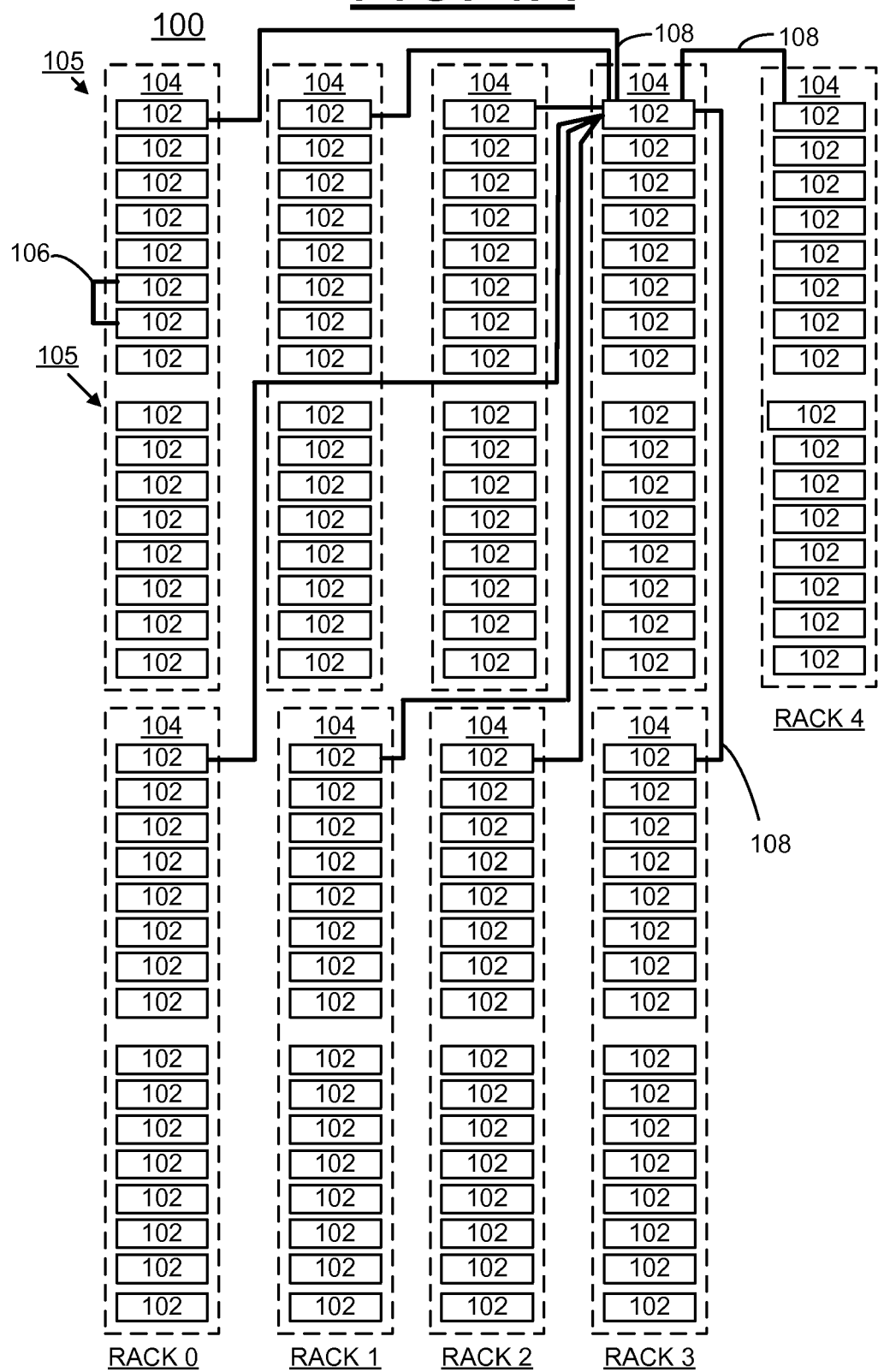
FIGS. 1A, 1B, 1C, 1D, and 1E are respective schematic and block diagrams illustrating an exemplary a local rack interconnect system for implementing enhanced transport layer flow control in accordance with the preferred embodiment.

Having reference now to the drawings, in FIG. 1A, there is shown an example multiple-path local rack interconnect system generally designated by the reference character 100 used for implementing enhanced transport layer flow control in accordance with the preferred embodiment. The multiple-path local rack interconnect system 100 supports computer system communications between multiple servers, and enables an Input/Output (IO) adapter to be shared across multiple servers. The multiple-path local rack interconnect system 100 supports network, storage, clustering and Peripheral Component Interconnect Express (PCIe) data traffic.

The multiple-path local rack interconnect system 100 includes a plurality of interconnect chips 102 in accordance with the preferred embodiment arranged in groups or super nodes 104. Each super node 104 includes a predefined number of interconnect chips 102, such as 16 interconnect chips, arranged as a chassis pair including a first and a second chassis group 105, each including 8 interconnect chips 102. The multiple-path local rack interconnect system 100 includes, for example, a predefined maximum number of nine super nodes 104. As shown, a pair of super nodes 104 are provided within four racks or racks 0-3, and a ninth super node 104 is provided within the fifth rack or rack 4.

In FIG. 1A, the multiple-path local rack interconnect system 100 is shown in simplified form sufficient for understanding the invention, with one of a plurality of local links (L-links) 106 shown between a pair of the interconnect chips 102 within one super node 104. The multiple-path local rack interconnect system 100 includes a plurality of L-links 106 connecting together all of the interconnect chips 102 of each super node 104. A plurality of distance links (D-links) 108, or as shown eight D-links 108 connect together the example nine super nodes 104 together in the same position in each of the other chassis pairs. Each of the L-links 106 and D-links 108 comprises a bi-directional (×2) high-speed serial (HSS) link.

Figure 1B:
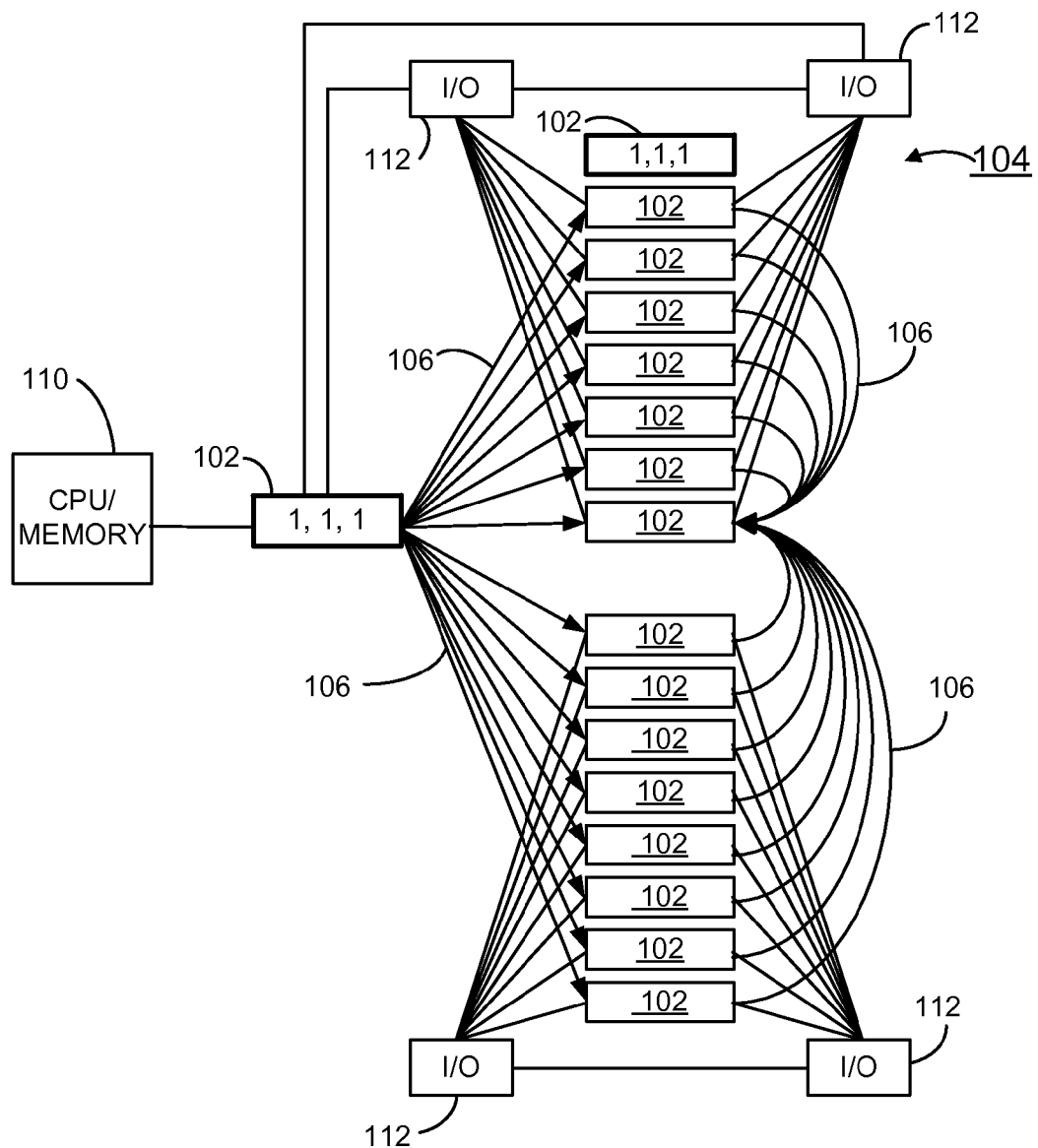
Figure 1C:
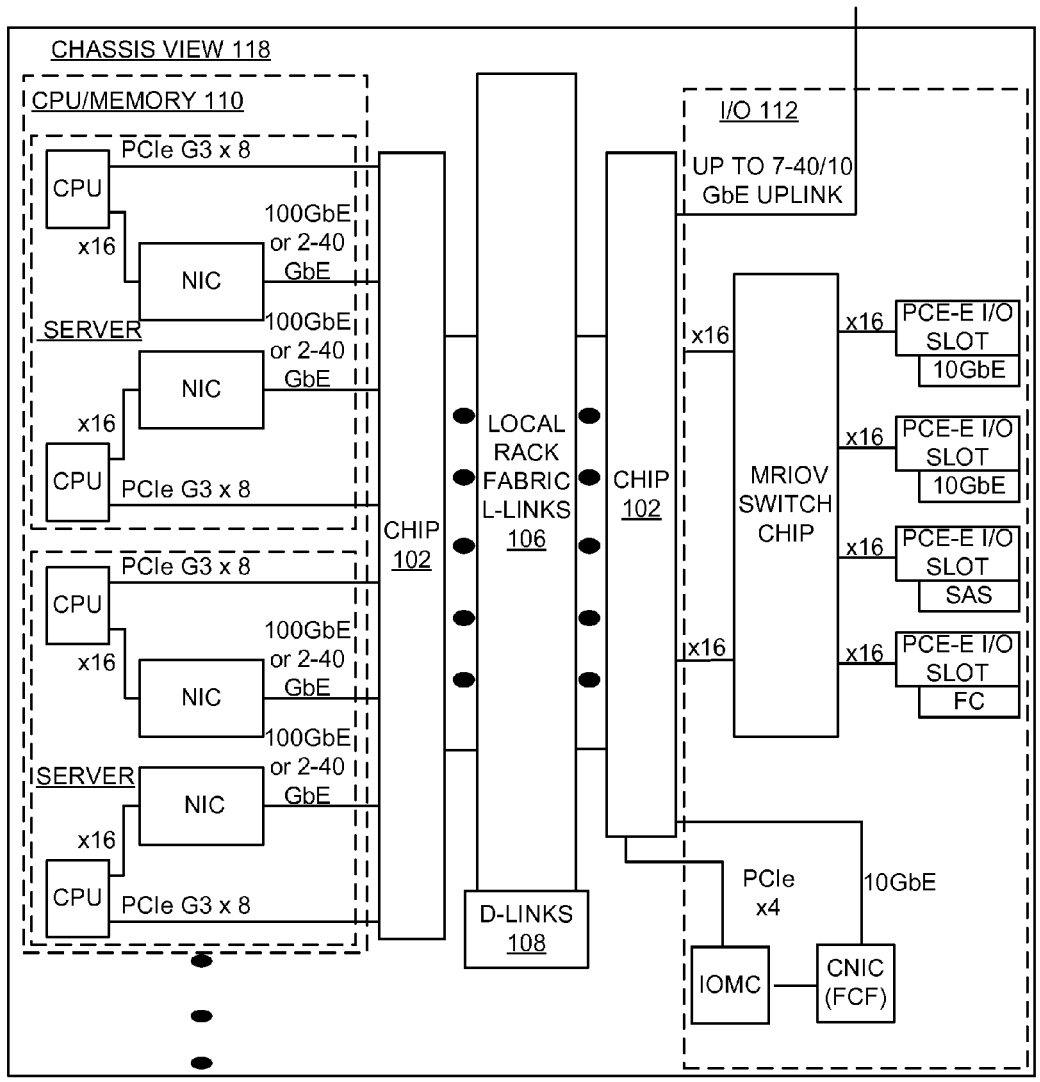
Figure 1D:
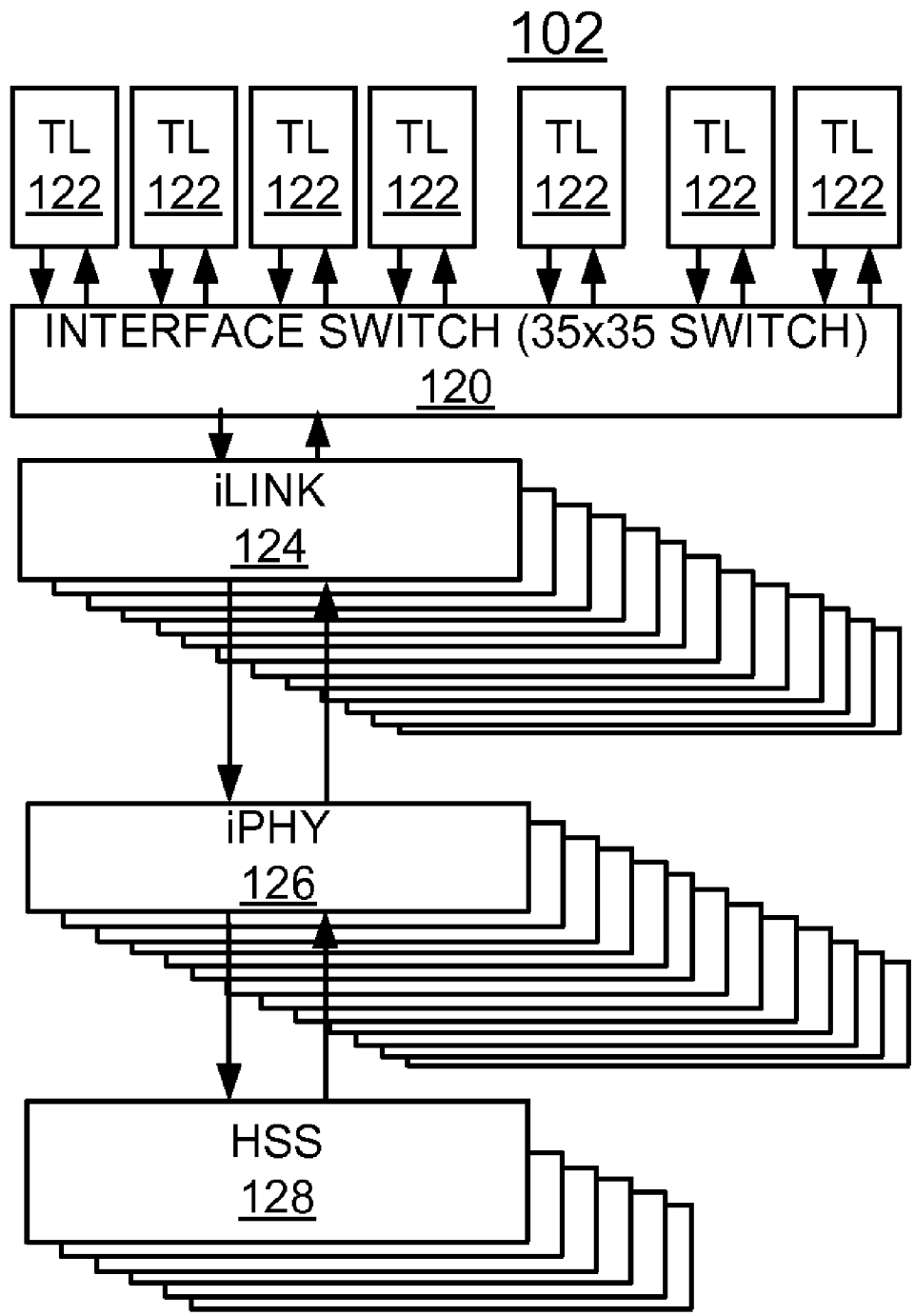
Figure 1E:
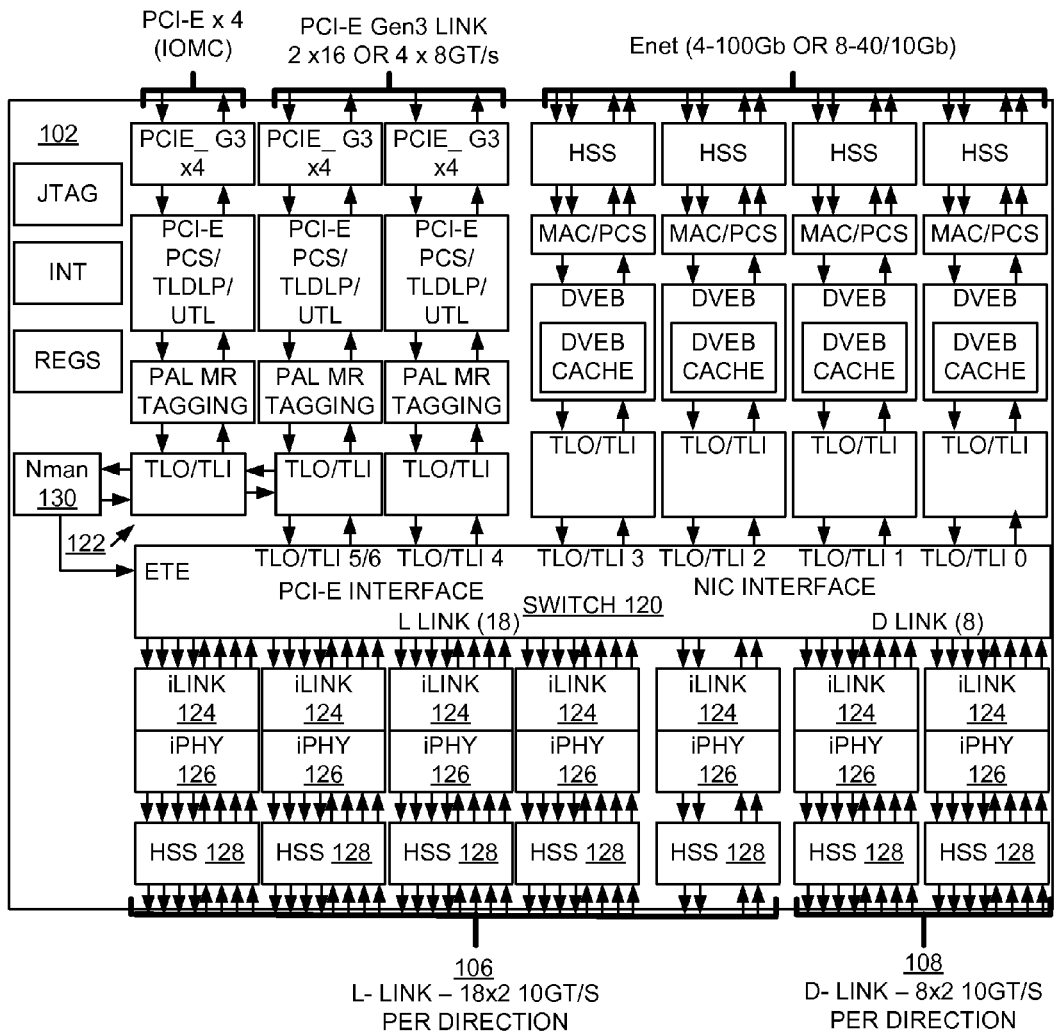

Referring also to FIG. 1E, each of the interconnect chips 102 of FIG. 1A includes, for example, 18 L-links 106, labeled 18 ×2 10 GT/S PER DIRECTION and 8 D-links 108, labeled 8 ×2 10 GT/S PER DIRECTION.

Referring also to FIGS. 1B and 1C, multiple interconnect chips 102 defining a super node 104 are shown connected together in FIG. 1B. A first or top of stack interconnect chip 102, labeled 1,1,1 is shown twice in FIG. 1B, once off to the side and once on the top of the stack. Connections are shown to the illustrated interconnect chip 102, labeled 1,1,1 positioned on the side of the super node 104 including a plurality of L-links 106 and a connection to a device 110, such as a central processor unit (CPU)/memory 110. A plurality of D links 108 or eight D-links 108 as shown in FIG. 1A, (not shown in FIG. 1B) are connected to the interconnect chips 102, such as interconnect chip 102, labeled 1,1,1 in FIG. 1B.

As shown in FIG. 1B, each of a plurality of input/output (I/O) blocks 112, is connected to respective interconnect chips 102, and respective ones of the I/O 112 are connected together. A source interconnect chip 102, such as interconnect chip 102, labeled 1,1,1 transmits or sprays all data traffic across all L-links 106. A local I/O 112 may also use a particular L-link 106 of destination I/O 112. For a destination inside a super node 104, or chassis pair of first and second chassis group 105, a source interconnect chip or an intermediate interconnect chip 102 forwards packets directly to a destination interconnect chip 102 over an L-link 106. For a destination outside a super node 104, a source interconnect chip or an intermediate interconnect chip 102 forwards packets to an interconnect chip 102 in the same position on the destination super node 104 over a D-link 108. The interconnect chip 102 in the same position on the destination super node 104 forwards packets directly to a destination interconnect chip 102 over an L-link 106.

In the multiple-path local rack interconnect system 100, the possible routing paths with the source and destination interconnect chips 102 within the same super node 104 include a single L-link 106; or a pair of L-links 106. The possible routing paths with the source and destination interconnect chips 102 within different super nodes 104 include a single D-link 108 (D); or a single D-link 108, and a single L-link 106 (D-L); or a single L-link 106, and single D-link 108 (L-D); or a single L-link 106, a single D-link 108, and a single L-link 106 (L-D-L). With an unpopulated interconnect chip 102 or a failing path, either the L-link 106 or D-link 108 at the beginning of the path is removed from a spray list at the source interconnect 102.

As shown in FIGS. 1B and 1C, a direct path is provided from the central processor unit (CPU)/memory 110 to the interconnect chips 102, such as chip 102, labeled 1,1,1 in FIG. 1B, and from any other CPU/memory connected to another respective interconnect chip 102 within the super node 104.

Referring now to FIG. 1C, a chassis view generally designated by the reference character 118 is shown with a first of a pair of interconnect chips 102 connected a central processor unit (CPU)/memory 110 and the other interconnect chip 102 connected to input/output (I/O) 112 connected by local rack fabric L-links 106, and D-links 108. Example connections shown between each of an illustrated pair of servers within the CPU/memory 110 and the first interconnect chip 102 include a Peripheral Component Interconnect Express (PCIe) G3 ×8, and a pair of 100 GbE or 2-40 GbE to a respective Network Interface Card (NIC). Example connections of the other interconnect chip 102 include up to 7-40/10 GbE Uplinks, and example connections shown to the I/O 112 include a pair of PCIe G3 ×16 to an external MRIOV switch chip, with four ×16 to PCI-E I/O Slots with two Ethernet slots indicated 10 GbE, and two storage slots indicated as SAS (serial attached SCSI) and FC (fibre channel), a PCIe ×4 to a IOMC and 10 GbE to CNIC (FCF).

Referring now to FIGS. 1D and 1E, there are shown block diagram representations illustrating an example interconnect chip 102. The interconnect chip 102 includes an interface switch 120 connecting a plurality of transport layers (TL) 122, such as 7 TLs, and interface links (iLink) layer 124 or 26 iLinks. An interface physical layer protocol, or iPhy 126 is coupled between the interface links layer iLink124 and high speed serial (HSS) interface 128, such as 7 HSS 128. As shown in FIG. 1E, the 7 HSS 128 are respectively connected to the illustrated 18 L-links 106, and 8 D-links 108. In the example implementation of interconnect chip 102, 26 connections including the illustrated 18 L-links 106, and 8 D-links 108 to the 7 HSS 128 are used, while the 7 HSS 128 would support 28 connections.

The TLs 122 provide reliable transport of packets, including recovering from broken chips 102 and broken links 106, 108 in the path between source and destination. For example, the interface switch 120 connects the 7 TLs 122 and the 26 iLinks 124 in a crossbar switch, providing receive buffering for iLink packets and minimal buffering for the local rack interconnect packets from the TLO 122. The packets from the TL 122 are sprayed onto multiple links by interface switch 120 to achieve higher bandwidth. The iLink layer protocol 124 handles link level flow control, error checking CRC generating and checking, and link level retransmission in the event of CRC errors. The iPhy layer protocol 126 handles training sequences, lane alignment, and scrambling and descrambling. The HSS 128, for example, are 7 ×8 full duplex cores providing the illustrated 26 ×2 lanes.

In FIG. 1E, a more detailed block diagram representation illustrating the example interconnect chip 102 is shown. Each of the 7 transport layers (TLs) 122 includes a transport layer out (TLO) partition and transport layer in (TLI) partition. The TLO/TLI 122 respectively receives and sends local rack interconnect packets from and to the illustrated Ethernet (Enet), and the Peripheral Component Interconnect Express (PCI-E), PCI-E ×4, PCI-3 Gen3 Link respectively via network adapter or fabric adapter, as illustrated by blocks labeled high speed serial (HSS), media access control/physical coding sub-layer (MAC/PCS), distributed virtual Ethernet bridge (DVEB); and the PCIE_G3 ×4, and PCIE_G3 2×8, PCIE_G3 2×8, a Peripheral Component Interconnect Express (PCIe) Physical Coding Sub-layer(PCS) Transaction Layer/Data/Link Protocol (TLDLP) Upper Transaction Layer(UTL), PCIe Application Layer (PAL MR) TAGGING to and from the interconnect switch 120. A network manager (NMan) 130 coupled to interface switch 120 uses End-to-End (ETE) small control packets for network management and control functions in multiple-path local rack interconnect system 100. The interconnect chip 102 includes JTAG, Interrupt Handler (INT), and Register partition (REGS) functions.

In accordance with features of the invention, protocol methods and transport layer circuits are provided for implementing enhanced traffic flow using end-to-end credit flow control. The link and switch layers advantageously are constructed to support only a single virtual lane, regardless of the number of multiple virtual lanes that are supported at the application and transport layers. This simplifies the routing, buffering, and flow control at the link and switch layers.

Figure 2:
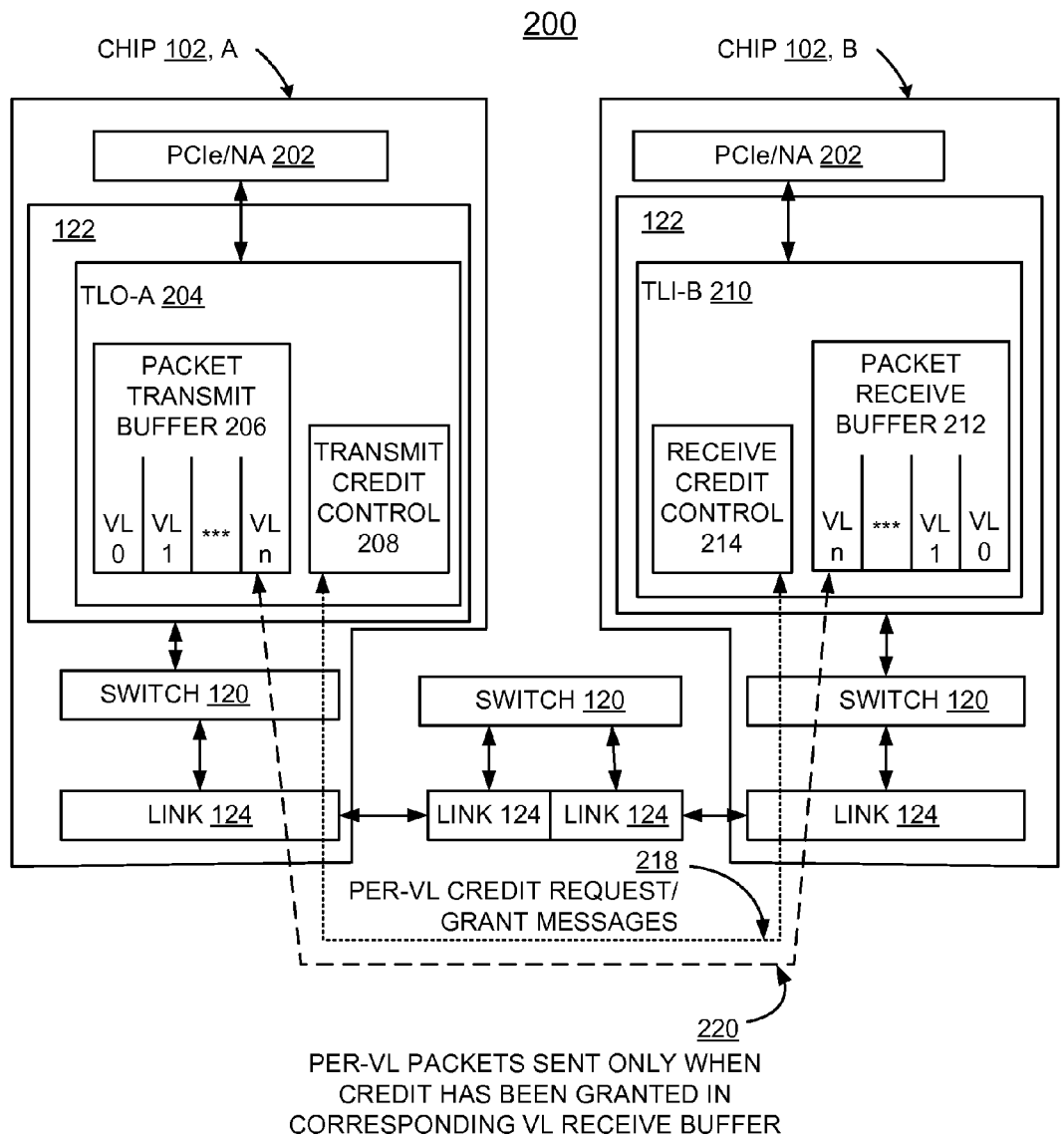
FIG. 2 is a schematic and block diagram illustrating a circuit for implementing enhanced transport layer flow control in accordance with the preferred embodiment.

Referring now to FIG. 2, there is shown a circuit generally designated by the reference character 200 for implementing enhanced transport layer flow control in accordance with the preferred embodiment. Circuit 200 and each interconnect chip 102 includes a respective Peripheral Component Interconnect Express (PCIe)/Network Adapter (NA) 202 or PCIe/NA 202 included in an illustrated pair of interconnect chips 102 of a source interconnect chip 102, A and a destination interconnect chip 102, B. Circuit 200 and each interconnect chip 102 includes a transport layer 122 including a respective transport layer out (TLO)-A 204, and a respective transport layer in (TLI)-B, 210 as shown in FIG. 2.

Each TL0 204 includes a packet transmit buffer 206 providing packet buffering and supplying a plurality of transmit virtual lanes VL0-VLn to application layers, such as, the PCIe/NA 202. Each TLO 204 includes a transmit credit control 208 providing credit negotiation for multiple virtual lanes VL0-VLn.

Circuit 200 and each interconnect chip 102 includes a switch 120 and a link layer 124 configured to only support one virtual lane onto which all the transmit virtual lanes VL0-VLn are mapped.

Circuit 200 and each interconnect chip 102 includes a transport layer 122 including a respective transport layer in (TLI)-A 210, as shown in FIG. 2. Each TLI 210 includes a packet receive buffer 212 providing packet buffering and supplying a plurality of receive virtual lanes VL0-VLn to application layers, such as, the PCIe/NA 202. Each TLI 210 includes a receive credit control 212 providing credit grants only for available buffer space 212 responsive to credit request messages.

In accordance with features of the invention, the TLI 210 of the destination transport layer 122 only grants credit for buffer space 212 when the buffer space 212 is actually available. The TLO 204 of the source transport layer 122 never sends a packet unless it has credit in the destination transport layer, then all packets in the switch 120 and link layer 124 have a guaranteed spot in the destination transport layer buffers 212. As a result, the possibility for blockage of one or more virtual lanes VL0-VLn at the application and transport layer interface to propagate down to cause blockage in the respective switch 120 and link layer 124 is eliminated.

As indicated at a line between the transmit credit control 208 of the source transport layer 122 and the receive credit control 212 of the destination transport layer 122 representing a Control Virtual Lane (CVL) labeled 218 PER-VL CREDIT REQUEST/GRANT MESSAGES, the transmit credit control 208 sends a credit request to the receive credit control 212. The receive credit control 212 of the destination transport layer 122 sends a credit grant message to the transmit credit control 208. The credit request/grant messages and other small fixed-size end-to-end (ETE) acknowledges and messages are sent between the source transport layer 122 and the destination transport layer 122 through the respective switch 120 and link layers 124 in the Control Virtual Lane (CVL) 218, which is smaller, simpler, and separate from a virtual lane that moves packets through the respective switch 120 and link layers 124. The CVL 218 has higher priority as compared to the packet virtual lane, uses much less buffering than the virtual lane for packets, and does not have error recovery of the virtual lane for packets. Full flow control is not required for the CVL 218 as provided for the packet virtual lane.

As indicated at a line between the transmit credit control 208 and the receive credit control 212 representing the packet virtual lane labeled 220 PER-VL PACKETS SENT ONLY WHEN CREDIT HAS BEEN GRANTED IN CORRESPONDING VL RECEIVE BUFFER, packets are sent from a particular virtual lane of the packet transmit buffer 206 to the corresponding virtual lane of the packet receive buffer 212 when a credit grant message is received responsive to the credit request message.

Each TLI 210 including the receive credit control 212 provide an end-to-end (ETE) acknowledge message to the transmit TLO 204 responsive to receiving packets in a corresponding virtual lane of buffer space 212, which is transferred to the associated application layers, such as, the PCIe/NA 202. The transmit credit control 208 of source TLO-A 204 sends a request credit decrease message to the receive credit control 214 of destination TLI-B 210 to release credits. The receive credit control 212 of the destination transport layer 122 sends a credit decrease message to the transmit credit control 208 to release the credits. The source TLO-A 204 may use the returned credits to send a next frame or frames responsive to the ETE acknowledge message instead of sending the request credit decrease message to the receive credit control 214 of destination TLI-B 210.

Figure 3:
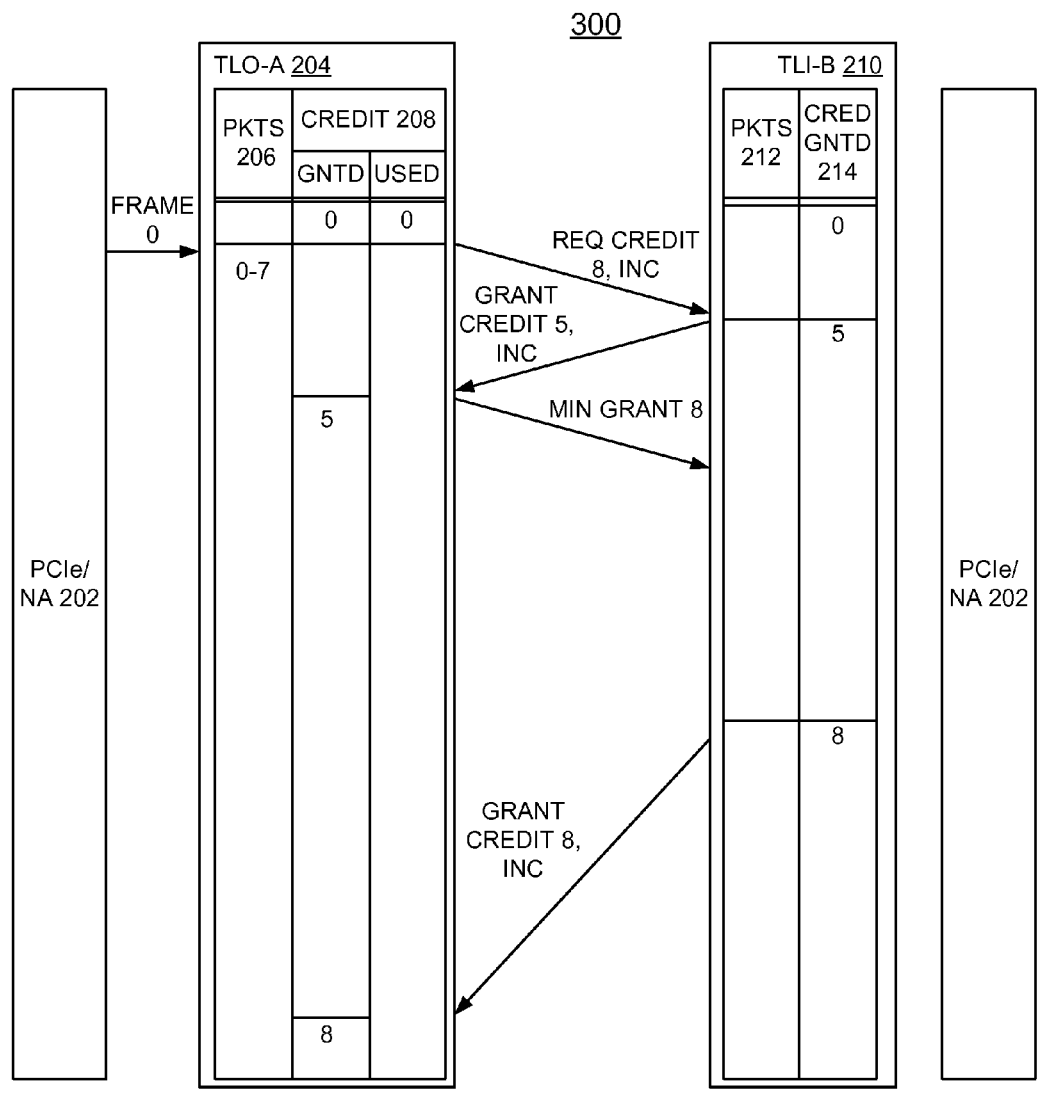
FIGS. 3, 4, and 5 are flow charts illustrating exemplary operations performed by the circuit of FIG. 2 for implementing enhanced transport layer flow control in accordance with the preferred embodiment.

Referring now to FIG. 3, there are shown exemplary operations generally designated by the reference character 300 performed by the circuit 200 for implementing enhanced transport layer flow control in accordance with the preferred embodiment. Enhanced transport layer flow control operations 300 illustrate credit request operations starting with a large frame as indicated at a line FRAME 0 received by the TLO-A, 204 from the PCIe/NA 202. Initially the transmit credit control 208 includes both zero (0) granted and used credits with virtual lanes of the packet transmit buffer 206 receiving 8 packets 0-7 of FRAME 0. The transmit credit control 208 of source TLO-A 204 sends a request credit message to the receive credit control 214 of destination TLI-B 210 for an credit increase of 8 credits as indicated at a line labeled REQ CREDIT 8, INC. The receive credit control 214 of destination TLI-B 210 sends a grant credit increase message of 5 credits when 5 credits are available as indicated at a line labeled GRANT CREDIT 5, INC. In response the transmit credit control 208 of source TLO-A 204 sends a minimum request credit message to the receive credit control 214 of destination TLI-B 210 for a minimum credit grant of 8 credits as indicated at a line labeled MIN GRANT 8. The receive credit control 214 of destination TLI-B 210 sends a grant credit increase message of 8 credits when 8 credits are available as indicated at a line labeled GRANT CREDIT 8, INC.

Figure 4:
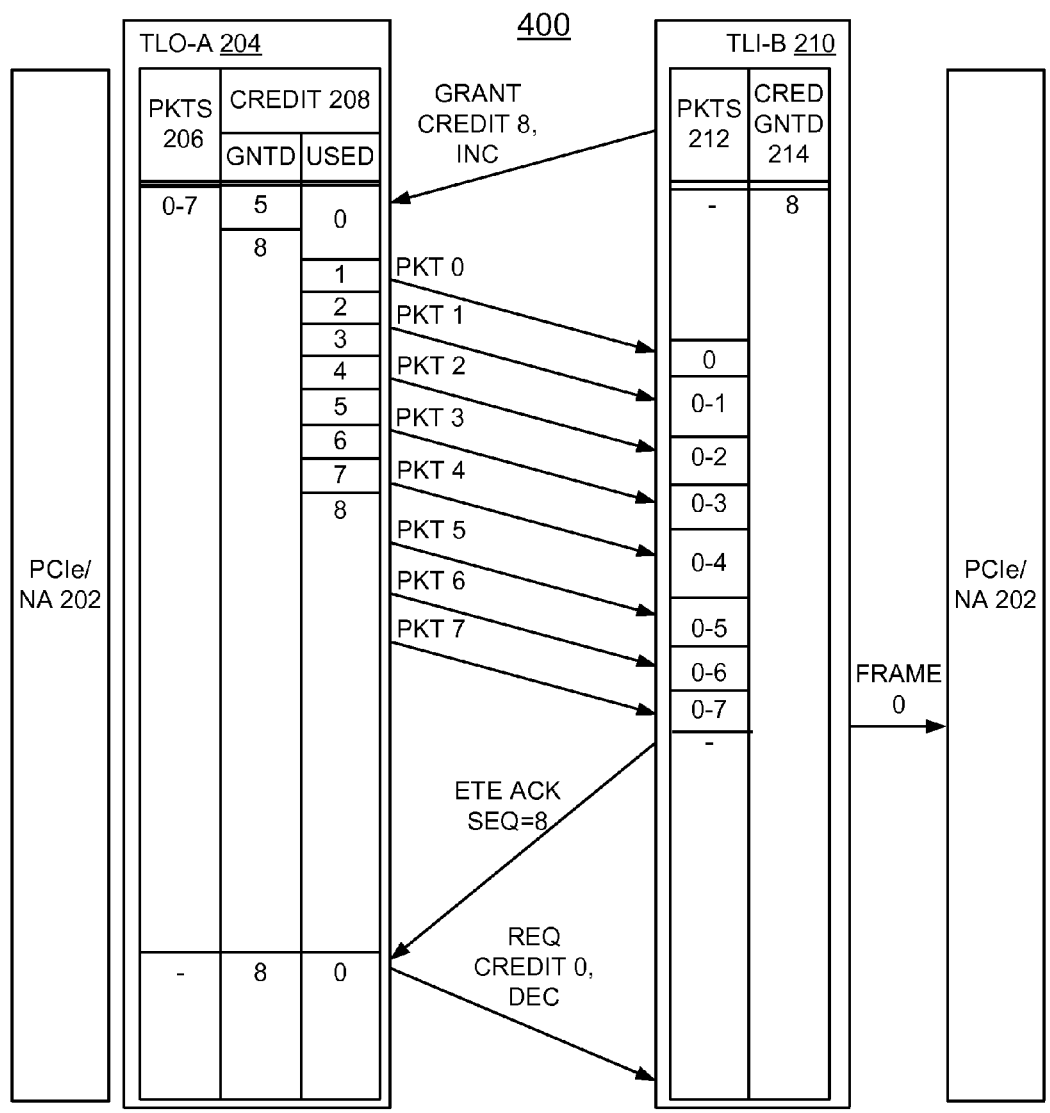

Referring now to FIG. 4, there are shown exemplary operations generally designated by the reference character 400 performed by the circuit 200 for implementing enhanced transport layer flow control in accordance with the preferred embodiment. Enhanced transport layer flow control operations 400 illustrate operations for sending frame parts or sending packets responsive to receive credit control 214 of destination TLI-B 210 sending a grant credit increase message of 8 credits when 8 credits are available as indicated at a line labeled GRANT CREDIT 8, INC. Initially the transmit credit control 208 includes five (5) granted credits and zero (0) used credits with virtual lanes of the packet transmit buffer 206 storing 8 packets 0-7 of FRAME 0. After the grant credit increase message of 8 credits when 8 credits are available at transmit credit control, then sending the stored 8 packets 0-7 of FRAME 0 as indicated at a respective line labeled PKT 0, PKT 1, PKT 2, PKT 3, PKT 4, PKT 5, PKT 6, and PKT 7, with the used credits increasing from 0 to 8. The destination TLI-B 210 sends an end-to-end (ETE) acknowledgement message indicating 8 packets 0-7 of FRAME 0 have been received as indicated at a line labeled ETE ACK SEQ=8. The transmit credit control 208 of source TLO-A 204 sends a request credit decrease message to the receive credit control 214 of destination TLI-B 210 for an credit decrease to 0 credits as indicated at a line labeled REQ CREDIT 0, DEC.

Figure 5:
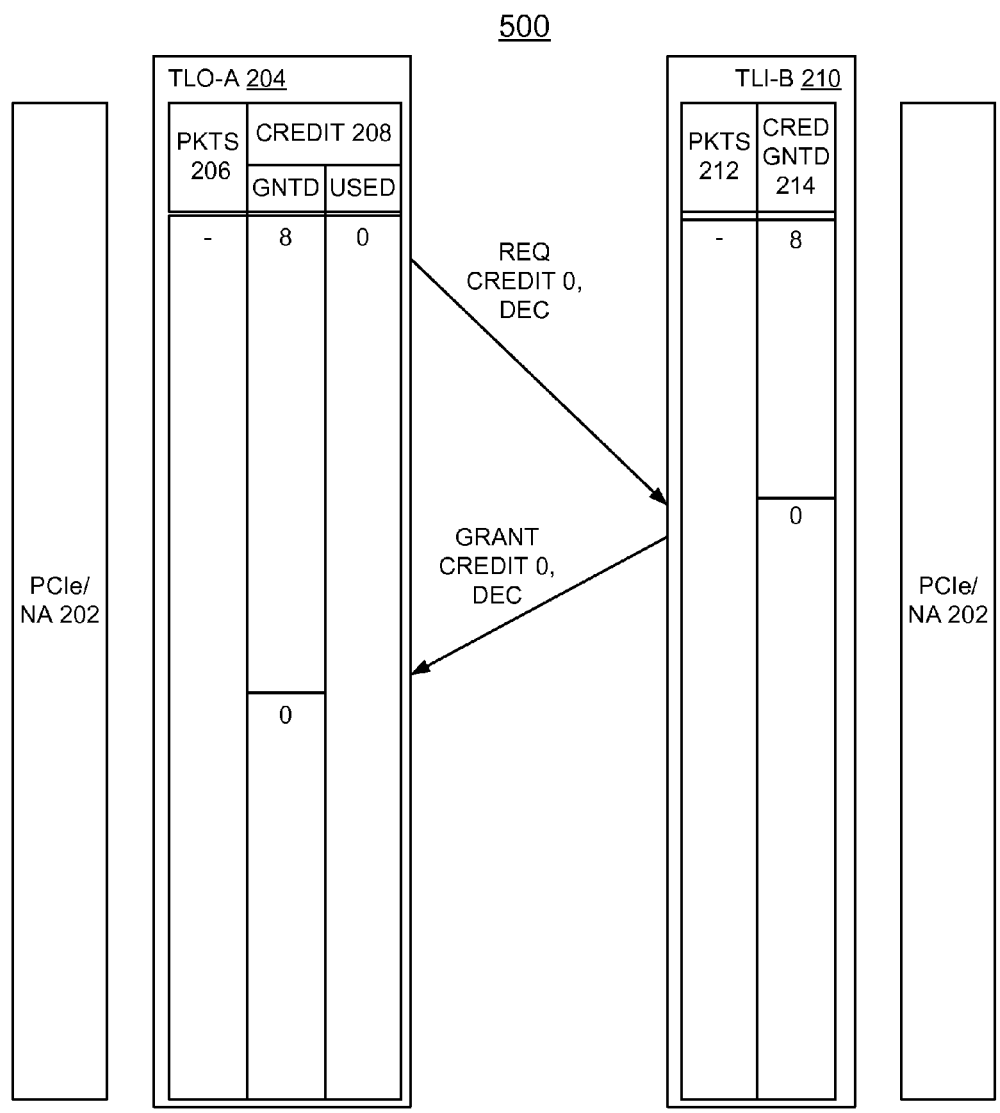

Referring now to FIG. 5, there are shown exemplary operations generally designated by the reference character 500 performed by the circuit 200 for implementing enhanced transport layer flow control in accordance with the preferred embodiment. Enhanced transport layer flow control operations 500 illustrate operations for credit return operations for the large frame that has been sent starting with the transmit credit control 208 of source TLO-A 204 sending a request credit decrease message to the receive credit control 214 of destination TLI-B 210 for a credit decrease for 0 credits as indicated at a line labeled REQ CREDIT 0, DEC. Initially the transmit credit control 208 includes eight (8) granted credits and zero (0) used credits with virtual lanes of the packet transmit buffer 206 empty. The receive credit control 214 of destination TLI-B 210 sends a grant credit decrease message of 0 credits responsive to the transmit credit control 208 of source TLO-A 204 sending the request credit decrease message as indicated at a line labeled GRANT CREDIT 0, DEC. Then the previously granted credits are available for a next credit request.

Figure 6:
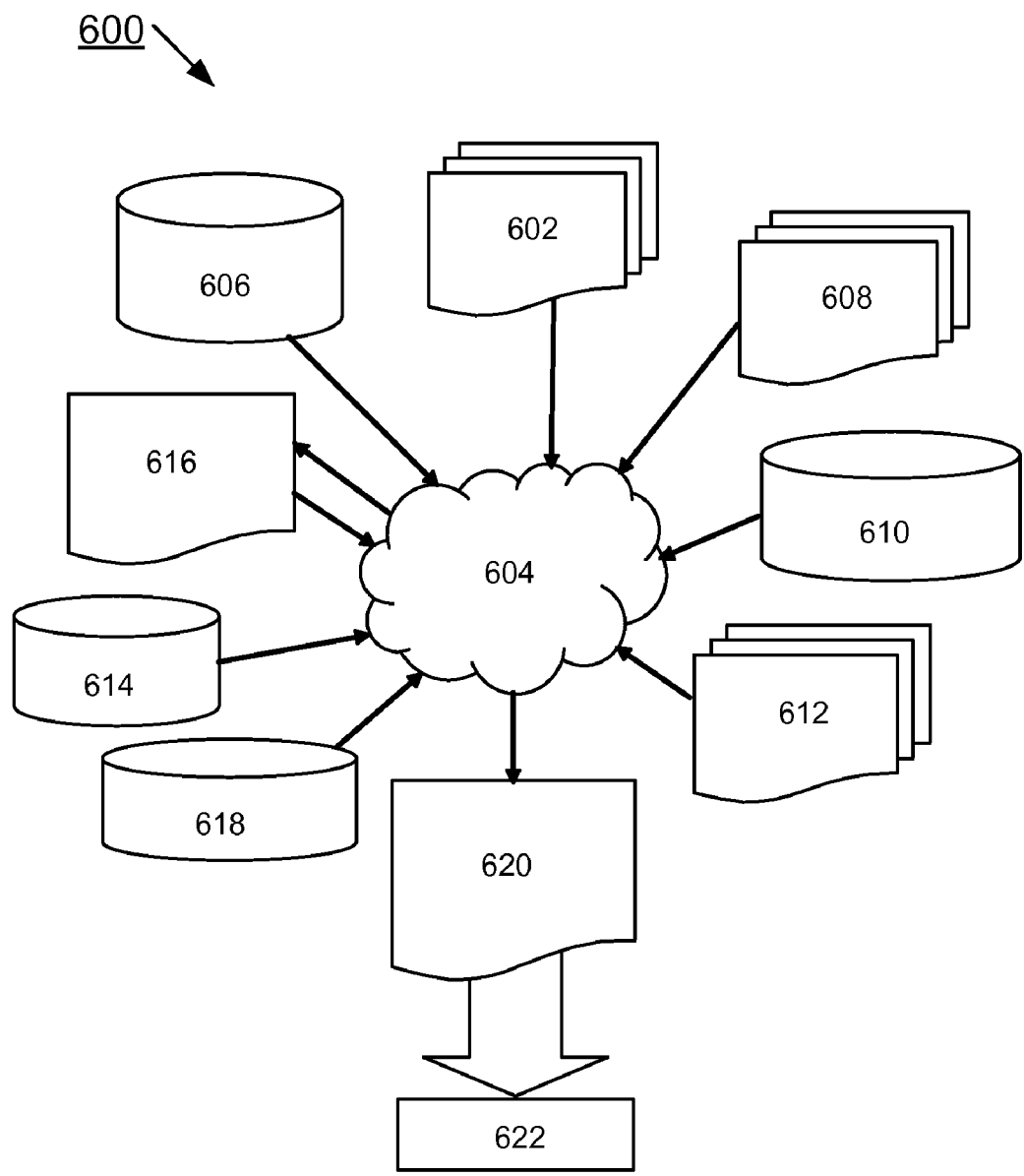
FIG. 6 is a flow diagram of a design process used in semiconductor design, manufacturing, and/or test.

FIG. 6 shows a block diagram of an example design flow 600 that may be used for high speed serial link circuit and the interconnect chip described herein. Design flow 600 may vary depending on the type of IC being designed. For example, a design flow 600 for building an application specific IC (ASIC) may differ from a design flow 600 for designing a standard component. Design structure 602 is preferably an input to a design process 604 and may come from an IP provider, a core developer, or other design company or may be generated by the operator of the design flow, or from other sources. Design structure 602 comprises circuits 102, 200 in the form of schematics or HDL, a hardware-description language, for example, Verilog, VHDL, C, and the like. Design structure 602 may be contained on one or more machine readable medium. For example, design structure 602 may be a text file or a graphical representation of circuits 102, 200. Design process 604 preferably synthesizes, or translates, circuits 102, 200 into a netlist 606, where netlist 606 is, for example, a list of wires, transistors, logic gates, control circuits, I/O, models, etc. that describes the connections to other elements and circuits in an integrated circuit design and recorded on at least one of machine readable medium. This may be an iterative process in which netlist 606 is resynthesized one or more times depending on design specifications and parameters for the circuits.

Design process 604 may include using a variety of inputs; for example, inputs from library elements 608 which may house a set of commonly used elements, circuits, and devices, including models, layouts, and symbolic representations, for a given manufacturing technology, such as different technology nodes, 32 nm, 45 nm, 90 nm, and the like, design specifications 610, characterization data 612, verification data 614, design rules 616, and test data files 618, which may include test patterns and other testing information. Design process 604 may further include, for example, standard circuit design processes such as timing analysis, verification, design rule checking, place and route operations, and the like. One of ordinary skill in the art of integrated circuit design can appreciate the extent of possible electronic design automation tools and applications used in design process 604 without deviating from the scope and spirit of the invention. The design structure of the invention is not limited to any specific design flow.

Design process 604 preferably translates an embodiment of the invention as shown in FIGS. 1A-1E, 2, 3, 4, and 5 along with any additional integrated circuit design or data (if applicable), into a second design structure 620. Design structure 620 resides on a storage medium in a data format used for the exchange of layout data of integrated circuits, for example, information stored in a GDSII (GDS2), GL1, OASIS, or any other suitable format for storing such design structures. Design structure 620 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1A-1E, 2, 3, 4, and 5. Design structure 620 may then proceed to a stage 622 where, for example, design structure 620 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing transport layer flow control in an interconnect system, said method comprising:
   providing a transport layer coupled to an application layer;
   providing a respective switch and link layer coupled to said transport layer;
   providing said transport layer to support multiple virtual lanes to said application layer, and providing buffering and credit control for said multiple virtual lanes;
   a source transport layer, sending a credit request message for a virtual lane to a destination transport layer; and
   said source transport layer, sending a packet from the virtual lane to said destination transport layer only responsive to the credit request being granted by said destination transport layer.

2. The method for implementing transport layer flow control as recited in claim 1 wherein providing a respective switch and link layer coupled to said transport layer includes providing said respective switch and link layer to support a single virtual lane.

3. The method for implementing transport layer flow control as recited in claim 1 wherein said source transport layer, sending a packet from the virtual lane to said destination transport layer only responsive to the credit request being granted by said destination transport layer includes said destination transport layer granting the credit request only with available receive buffer space.

4. The method for implementing transport layer flow control as recited in claim 1 wherein said source transport layer sending said credit request message from said virtual lane to said destination transport layer includes said source transport layer receiving a frame from said application layer, and storing packets in a packet transmit buffer including said multiple virtual lanes.

5. The method for implementing transport layer flow control as recited in claim 1 wherein said source transport layer sends a minimum credit request message for a virtual lane to said destination transport layer.

6. The method for implementing transport layer flow control as recited in claim 1 wherein said source transport layer responsive to receiving an acknowledgement message for said packet received by said destination transport layer, sends a credit decrease request message for said virtual lane to said destination transport layer.

7. The method for implementing transport layer flow control as recited in claim 6 wherein said source transport layer releases a credit granted value responsive to the decrease credit request being granted by said destination transport layer.

8. A circuit for implementing transport layer flow control in an interconnect system comprising:
   a transport layer;
   an application layer coupled to said transport layer;
   a respective switch and link layer coupled to said transport layer;
   said transport layer supporting multiple virtual lanes to said application layer, and providing buffering and credit control for said multiple virtual lanes;
   a source transport layer, sending a credit request message for a virtual lane to a destination transport layer; and
   said source transport layer, sending a packet from the virtual lane to said destination transport layer only responsive to the credit request being granted by said destination transport layer.

9. The circuit for implementing transport layer flow control as recited in claim 8 wherein said respective switch and link layer support a single virtual lane.

10. The circuit for implementing transport layer flow control as recited in claim 8 wherein said destination transport layer grants the credit request only with available receive buffer space.

11. The circuit for implementing transport layer flow control as recited in claim 8 wherein said source transport layer receiving a frame from said application layer, stores packets in a packet in a virtual lane of said transmit buffer.

12. The circuit for implementing transport layer flow control as recited in claim 8 wherein said source transport layer responsive to receiving an acknowledgement message for said packet received by said destination transport layer, sends a credit decrease request message for said virtual lane to said destination transport layer.

13. The circuit for implementing transport layer flow control as recited in claim 12 wherein said source transport layer releases a credit granted value responsive to the decrease credit request being granted by said destination transport layer.

14. A multiple-path local rack interconnect system comprising:
   a plurality of interconnect chips;
   a plurality of serial links connected between each of said plurality of interconnect chips;
   each of said interconnect chips including a transport layer; an application layer coupled to said transport layer; a respective switch and link layer coupled to said transport layer; said transport layer supporting multiple virtual lanes to said application layer, and providing buffering and credit control for said multiple virtual lanes;
   a source transport layer, sending a credit request message for a virtual lane to a destination transport layer; and
   said source transport layer, sending a packet from the virtual lane to said destination transport layer only responsive to the credit request being granted by said destination transport layer.

15. The multiple-path local rack interconnect system as recited in claim 14 wherein said respective switch and link layer support a single virtual lane.

16. The multiple-path local rack interconnect system as recited in claim 14 wherein said destination transport layer grants the credit request only with available receive buffer space.

17. The multiple-path local rack interconnect system as recited in claim 14 wherein said source transport layer responsive to receiving an acknowledgement message for said packet received by said destination transport layer, sends a credit decrease request message for said virtual lane to said destination transport layer.

18. The multiple-path local rack interconnect system as recited in claim 14 wherein said source transport layer resets a credit granted value responsive to the decrease credit request being granted by said destination transport layer.

19. A design structure embodied in a machine readable medium used in a design process, the design structure comprising:
   a circuit tangibly embodied in the machine readable medium used in the design process, said circuit for implementing transport layer flow control in an interconnect system, said circuit comprising:
   a transport layer; an application layer coupled to said transport layer; a respective switch and link layer coupled to said transport layer;
   said transport layer supporting multiple virtual lanes to said application layer, and providing buffering and credit control for said multiple virtual lanes;
   a source transport layer, sending a credit request message for a virtual lane to a destination transport layer; and
   said source transport layer, sending a packet for the virtual lane to said destination transport layer only responsive to the credit request being granted by said destination transport layer, wherein the design structure, when read and used in the manufacture of a semiconductor chip produces a chip comprising said circuit.

20. The design structure of claim 19, wherein the design structure comprises a netlist, which describes said circuit.

21. The design structure of claim 19, wherein the design structure resides on storage medium as a data format used for the exchange of layout data of integrated circuits.

22. The design structure of claim 19, wherein the design structure includes at least one of test data files, characterization data, verification data, or design specifications.

23. The design structure of claim 19, wherein said destination transport layer grants the credit request only with available receive buffer space, and wherein said respective switch and link layer support a single virtual lane.

\* \* \* \* \*